(12) United States Patent
Buck

(10) Patent No.: US 10,621,891 B1
(45) Date of Patent: Apr. 14, 2020

(54) THREE-DIMENSIONAL DECAL WITH HIGH-RESOLUTION IMAGE AND REMOVABLE ADHESIVE

(71) Applicant: Ronald Mark Buck, Encinitas, CA (US)

(72) Inventor: Ronald Mark Buck, Encinitas, CA (US)

(*) Notice: Subject to any disclaimer, the term of this patent is extended or adjusted under 35 U.S.C. 154(b) by 0 days.

(21) Appl. No.: 16/578,309

(22) Filed: Sep. 21, 2019

(51) Int. Cl.
| | |
|---|---|
| *G09F 3/10* | (2006.01) |
| *B29C 51/00* | (2006.01) |
| *G09F 3/02* | (2006.01) |
| *B44C 1/175* | (2006.01) |

(52) U.S. Cl.
CPC ............. *G09F 3/10* (2013.01); *B29C 51/002* (2013.01); *B44C 1/1754* (2013.01); *B44C 1/1758* (2013.01); *G09F 3/02* (2013.01); *G09F 2003/023* (2013.01); *G09F 2003/0208* (2013.01); *G09F 2003/0225* (2013.01)

(58) Field of Classification Search
CPC ...... G09F 3/10; G09F 3/02; G09F 2003/0241; F21S 9/02; F21V 23/0435; B29C 51/002; B44C 1/1754; B44C 1/1758; B32B 27/08; B32B 27/10; B32B 27/12; B32B 3/30; B32B 7/06; B32B 2307/4023; B32B 2307/409; B32B 2307/416; B32B 2307/412; B32B 2307/7265; B32B 2405/00; B32B 2451/00; B32B 2457/00
See application file for complete search history.

(56) References Cited

U.S. PATENT DOCUMENTS

| | | | |
|---|---|---|---|
| 3,758,358 A | 9/1973 | Kuroda | |
| 4,378,391 A | 3/1983 | Allen | |
| 5,001,853 A | 3/1991 | Odlen | |
| 5,246,757 A | 9/1993 | Condon | |
| 5,368,672 A | 11/1994 | Gunzelman | |
| 5,622,587 A | 4/1997 | Barthelman | |
| 6,023,872 A | 2/2000 | Falkenstein | |
| 6,170,881 B1 | 1/2001 | Salmon | |
| 6,651,370 B1 * | 11/2003 | Sud | B44C 5/02 40/124.07 |
| 6,857,211 B2 | 2/2005 | Grasso | |
| 8,551,379 B2 | 10/2013 | Simons | |
| 2004/0231211 A1 | 11/2004 | Johnson | |
| 2018/0190157 A1 * | 7/2018 | Quintin | B44C 3/025 |

FOREIGN PATENT DOCUMENTS

| | | |
|---|---|---|
| KR | 200324789 Y1 | 8/2003 |
| WO | 2012106052 | 8/2012 |

* cited by examiner

*Primary Examiner* — Patricia L. Nordmeyer
(74) *Attorney, Agent, or Firm* — Manuel de la Cerra

(57) ABSTRACT

A three-dimensional self-adhesive decal is disclosed. The decal includes a semi-rigid base sheet with an elevated coupling structure with an outer vertical wall. The base sheet also includes a removable adhesive layer and a release liner on a bottom surface of the base sheet. The elevated coupling structure may be either an elevated coupling ridge or an elevated foam coupling plateau. The decal also includes an upper 3-dimensional portion thermoformed from a semi-rigid plastic sheet. The 3-D portion includes a bottom-edge, vertically oriented coupling band that is constructed to couple with the outer vertical wall of the semi-rigid base sheet.

25 Claims, 12 Drawing Sheets

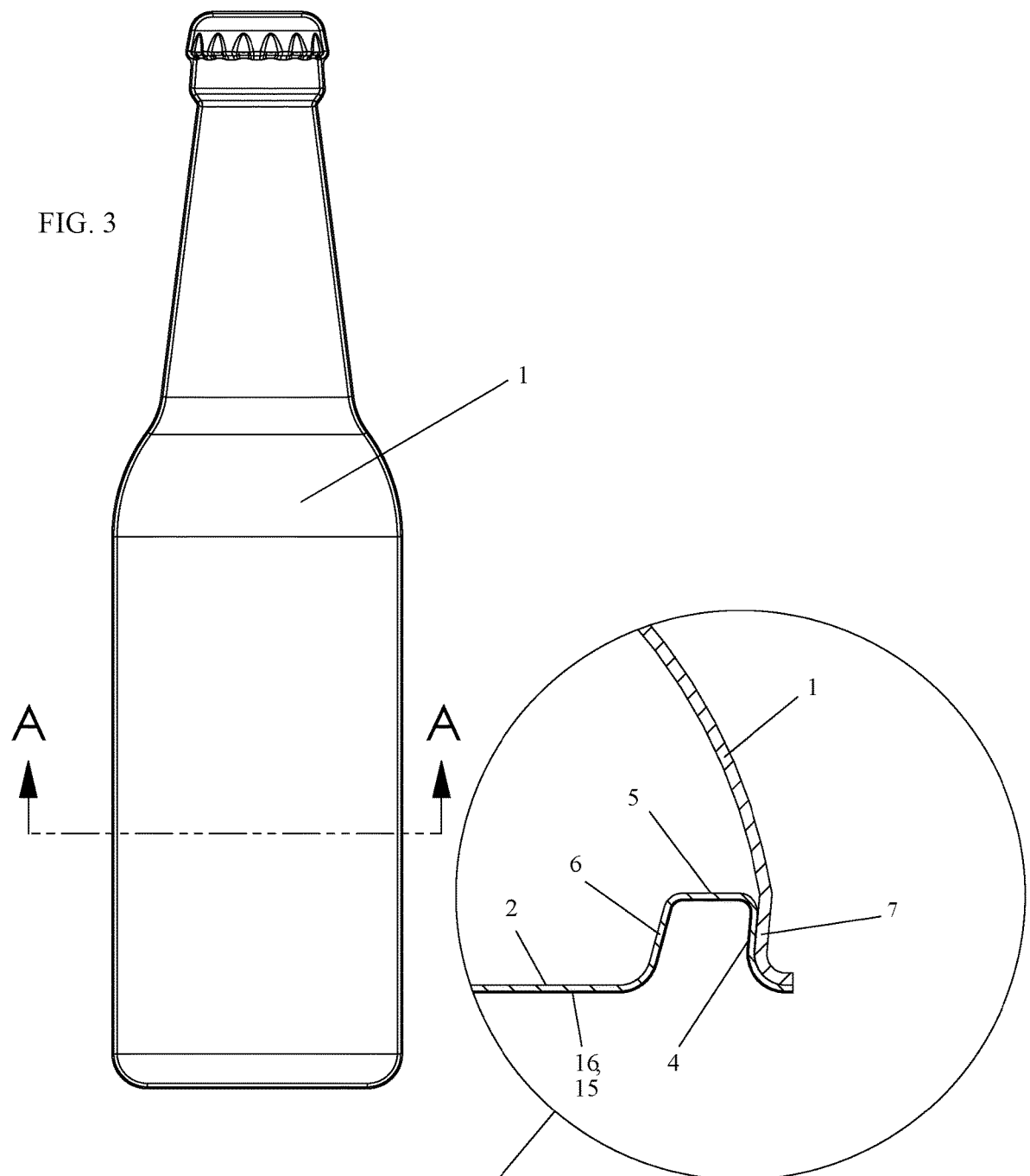
FIG. 3
FIG. 3B
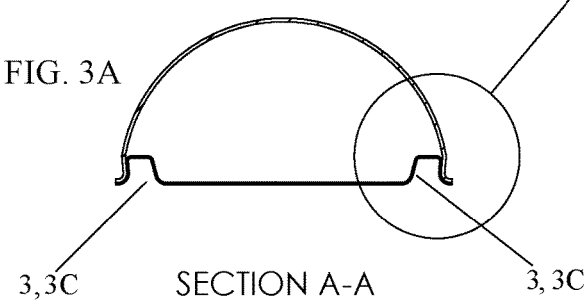
FIG. 3A    SECTION A-A

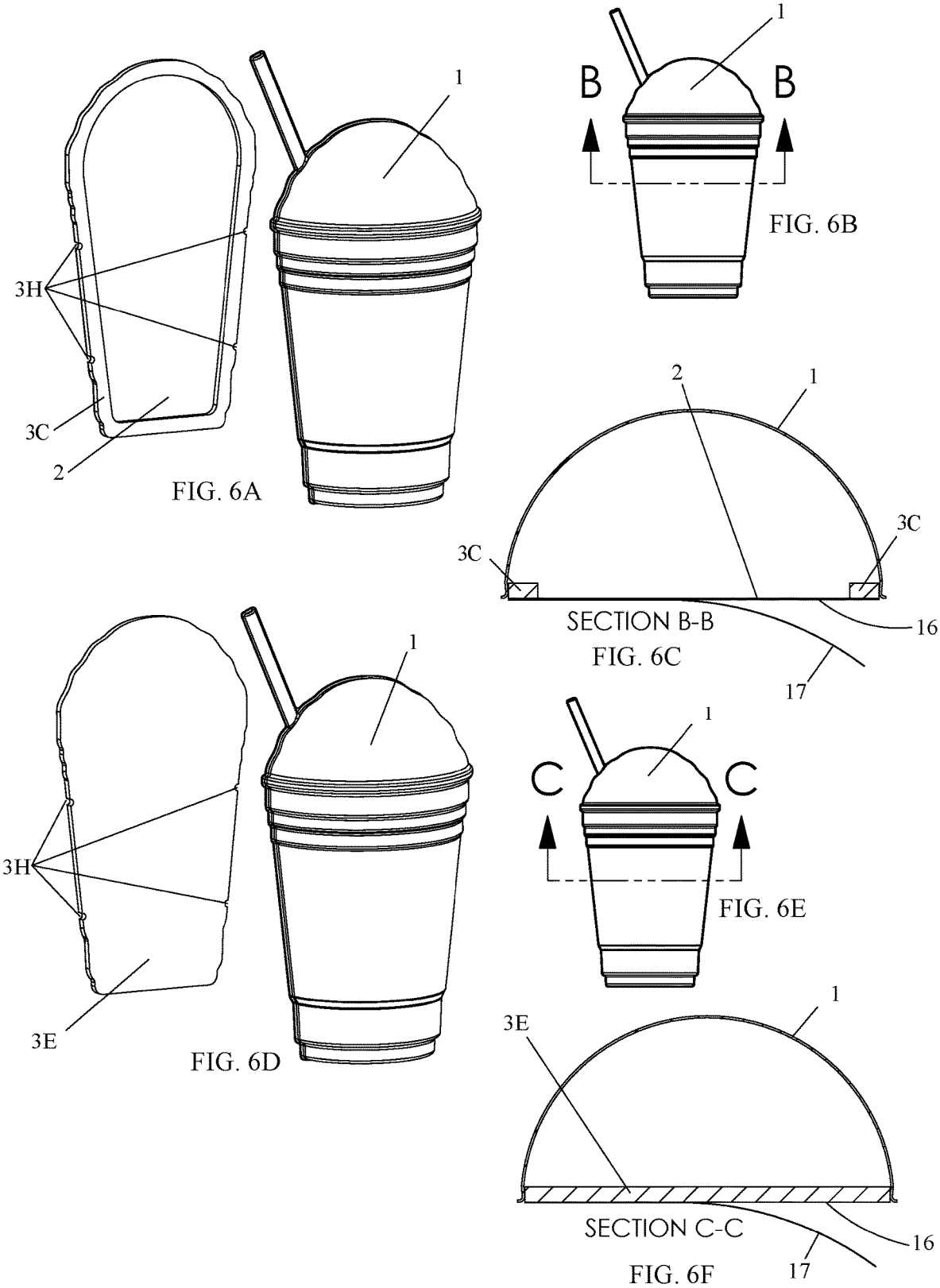

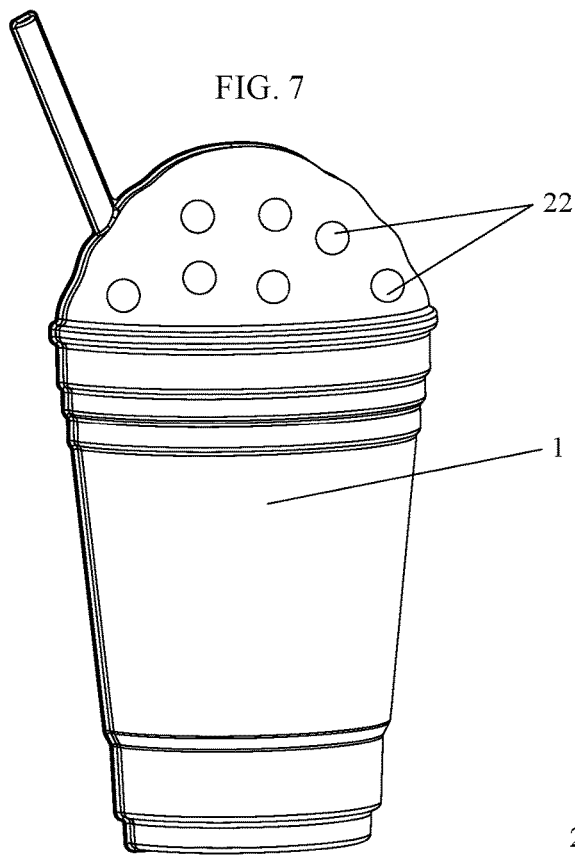
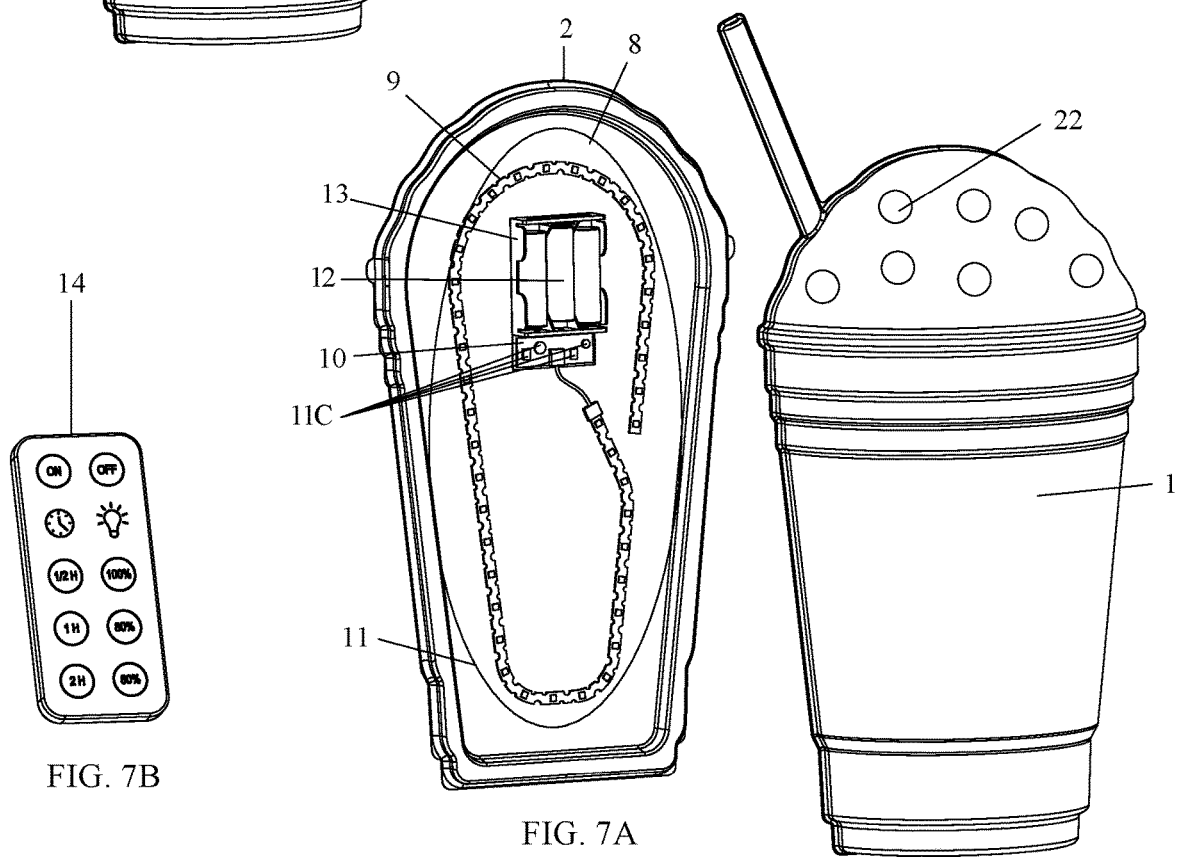
FIG. 7
FIG. 7B
FIG. 7A

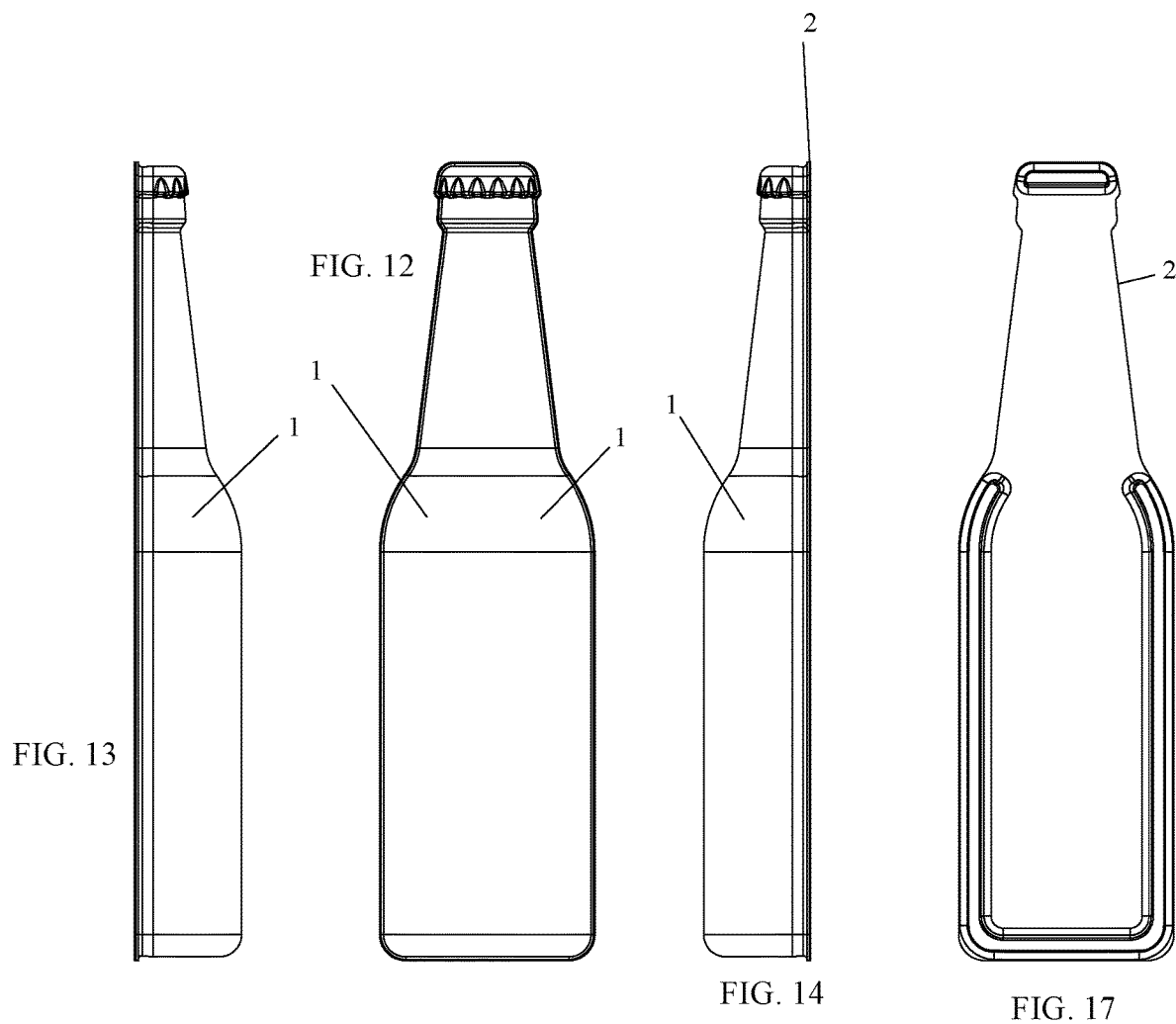

THREE-DIMENSIONAL DECAL WITH HIGH-RESOLUTION IMAGE AND REMOVABLE ADHESIVE

1.0 TECHNICAL FIELD

The present invention is related to thermoformed three-dimensional structures.

2.0 BACKGROUND

Three-dimensional thermoformed structures have long been a part of product design, and three-dimensional printing is becoming more and more popular, along with computer-aided design and software tools. Some applications which use three-dimensional thermoformed shapes on promotional materials, such as banners and labels for containers, have been conceived. A three-dimensional shape is more interesting and captures the viewer's attention more easily than does a flat two-dimensional structure; this is valuable in marketing and aesthetics.

U.S. Pat. No. 6,023,872 to Falkenstein, Sr., discloses a promotional display banner made from a flexible material that includes a raised region with a predetermined shape, which may be rolled up for storage or transport. This provides a weatherproof and large-dimensioned product for displaying promotions or advertisements, but since the banner material is flexible, it must be anchored to the display site by grommets and rope or cord at the outer edges of the base sheet to prevent the banner from fluttering in the wind. Perhaps, if the banner were constructed from a more permanent rigid material, it would not need to employ grommets and rope or cord, which are limited methods for attachment compared to an adhesive layer that would allow the banner to adhere to a multitude of flat display surfaces.

U.S. Pat. No. 6,857,211 to Grasso discloses a three-dimensional label for a container, formed in a solid modeling software program such as 3-D studio or Corel. Like U.S. Pat. No. 6,023,872, the Grasso patent also teaches the printing of the template or image on a flexible material, which is able to wrap around the curved surface of a bottle. It is apparent that Grasso has not contemplated the nuances associated with employing a rigid material, because a rigid material would not wrap around the curved surface of a bottle. In Grasso, adhesive is applied only on the flat portion of the label, and not underneath the entire label. In other words, there is no adhesive under the raised or three-dimensional structure of the label, nor is there any support to help the label maintain its shape should the label be peeled away from the container. This restricts the invention to one-time use applications, and therefore the invention does not relate to reusable labels for containers. Also, the invention disclosed by Grasso is not suitable for larger dimensioned applications such as an entire store window, since the three-dimensional structure lacks support beneath the raised three-dimensional area.

The invention of Grasso, like the invention of Falkenstein, Sr., teaches printing the media to be displayed on a flexible material, one that is not capable of providing the support needed by the three-dimensional structure for long-term use in outdoor environments.

What is needed, therefore, is a novel invention that incorporates a more rigid structure for displaying images and is designed to support three-dimensional shapes while having better characteristics, such as being repositionable, or being capable of integration with electronics, such as a light or speaker contained within an elevated region that may be operated via a wireless remote. Such a solution is offered by the present invention in the form of a novel three-dimensional sticker supported by rigid thermoformable layers that can retain the sticker's three-dimensional shape even while being repositioned again and again. Electronics may be pre-applied to a display surface or may be contained within an elevated region of the three-dimensional structure, and may be accessed by removing the 3-D sticker from the display surface. The 3-D sticker, due to its rigid structure and the materials selected for its construction, retains its shape during the process of removing or repositioning the sticker.

3.0 SUMMARY

A three-dimensional self-adhesive decal is provided. The decal includes a semi-rigid base sheet with an elevated coupling structure, which itself features an outer vertical wall. The base sheet also includes a removable adhesive layer and a release liner on a bottom surface of the base sheet. The elevated coupling structure may be either an elevated plastic or foam coupling ridge or an elevated foam coupling plateau. The decal also includes an upper 3-dimensional portion thermoformed from a semi-rigid plastic sheet. The 3-D portion includes a bottom-edge, vertically oriented coupling band that is constructed to couple with the outer vertical wall of the plastic or foam coupling ridge that part of the semi-rigid base sheet, or the outer vertical wall of the elevated foam coupling plateau.

The elevated coupling structure may be an elevated coupling ridge thermoformed into a self-adhesive base sheet, or an elevated foam coupling ridge adhered to a top surface of a self-adhesive base sheet, or may be configured as a self-adhesive elevated foam coupling plateau. The elevated coupling structure may be white or silver and may be reflective. The elevated coupling structure may have one or more air vent channels in the outer vertical wall of the coupling structure. The shape of the elevated coupling ridge may be thermoformed into the release liner, such that when the release liner is removed, the shape of the elevated coupling ridge is retained. The elevated coupling structure may have a static cling layer adhered to it.

The release liner may be flat in shape and made of either paper or plastic. The removable adhesive layer may be constructed from one or more self-adhesive strips, dots, squares, or rectangles.

The semi-rigid base sheet may be transparent, white, or may be constructed from a metallized sheet or a metallic reflective printed sheet. A reflective surface may be adhered to the top surface of the semi-rigid base sheet and an electronic assembly adhered to the reflective material layer. The semi-rigid sheet may have a white or silver reflective material layer adhered to the bottom surface of the semi-rigid base sheet, and a removable adhesive layer may be adhered to the reflective material layer. A static cling layer may be adhered to the bottom surface of the semi-rigid base sheet or elevated foam coupling plateau.

The upper 3-D portion may include a high-resolution color image printed onto a semi-rigid plastic sheet. The high-resolution color image may comprise UV stretchable inks. The upper 3-D portion plastic sheet may be transparent, translucent white, or opaque white, and the image may be printed on a top or bottom surface of the plastic sheet. The high-resolution color image may include one or more layers of colored ink that are printed with one or more layers of white ink printed behind the one or more layers of colored ink. The upper 3-D portion may include a metallized sheet, or a metallic reflective printed ink, and it may also include a thermoformable plastic sheet that is flocked with textile fibers, such as synthetic fur.

The decal may include an electronic assembly adhered to a top surface of the semi-rigid base sheet or elevated foam coupling plateau. The electronic assembly may include a light assembly, a PC board, and/or a sound assembly with a volume control, a music synchronizing sensor, and a speaker. The electronic assembly may be activated by a wireless remote control or a wireless app on a mobile device.

The decal may include one or more signal receptors positioned in the space between the upper 3-D portion of the decal and the semi-rigid base sheet, or elevated foam coupling plateau. A surface in the upper 3-D portion of the decal may be cut out or transparent to allow an electromagnetic, light or sound wave to pass inside the decal to the one or more signal receptors. Or one or more of the signal receptors may be located outside of the upper 3-D portion of the decal via a tab that is located adjacent to the outer perimeter shape of the upper 3-D structure.

The decal may also have a hanging tab positioned at a location outside of the perimeter of the decal and a hanging board may be connected to the hanging tab.

Additional aspects, alternatives and variations as would be apparent to persons of skill in the art are also disclosed herein and are specifically contemplated to be included as part of the invention. The invention is set forth only in the claims as allowed by the patent office in this or related applications, and the following summary descriptions of certain examples are not in any way to limit, define or otherwise establish the scope of legal protection.

4.0 BRIEF DESCRIPTION OF DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

FIG. 3 is a front view of the 3-D decal, wherein the location of a cross-section A-A is indicated.

FIG. 3A is a cross-sectional A-A view of the 3-D decal.

FIG. 3B is an enlarged cross-sectional view that shows the upper 3-D portion of the decal coupled to the self-adhesive base sheet.

FIG. 6A is a front isometric exploded view of the 3-D decal, wherein the upper 3-D portion of the decal is shown exploded above a self-adhesive base sheet that includes a self-adhesive elevated foam coupling ridge.

FIG. 6B is a front view of the 3-D decal, wherein the location of a cross-section B-B is indicated.

FIG. 6C is a cross-sectional B-B view of the 3-D decal.

FIG. 6D is a front isometric exploded view of the 3-D decal wherein the upper 3-D portion of the decal is shown exploded above an elevated foam coupling plateau.

FIG. 6E is a front view of the 3-D decal wherein the location of a cross-section C-C is indicated.

FIG. 6F is a cross-sectional C-C view of the 3-D decal.

FIG. 7 is a front isometric view of a 3-D decal (cup-shaped).

FIG. 7A is a front isometric exploded view of the 3-D decal wherein the upper 3-D portion of the decal is shown exploded above a self-adhesive base sheet, and the electronic assembly is visible.

FIG. 7B is a front isometric view of the wireless remote control for the control of the electronic assembly.

FIG. 12 is a front view of the 3-D decal.

FIG. 13 is a right-side view of the 3-D decal.

FIG. 14 is a left-side view of the 3-D decal.

FIG. 15 is a top view of the 3-D decal.

FIG. 16 is a bottom view of the 3-D decal.

FIG. 17 is a back view of the 3-D decal.

5.0 DETAILED DESCRIPTION

Figure 1:
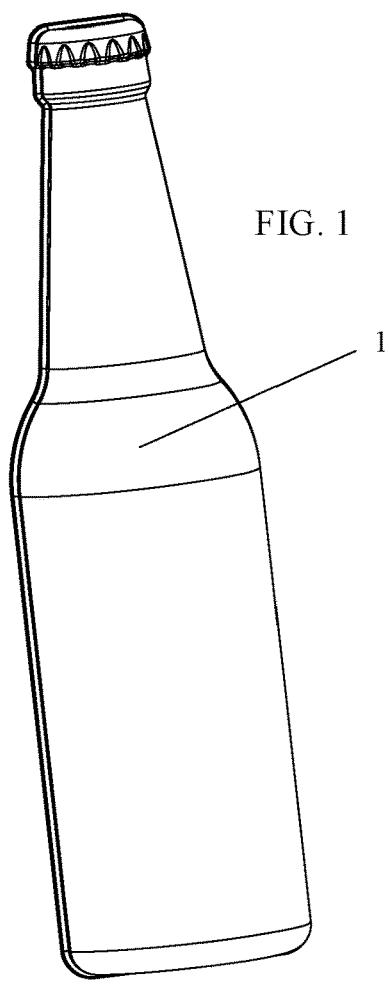
FIG. 1 is a front isometric view of a 3-D decal (bottle-shaped).

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with the attached figures and is provided for ease of reference, where like reference numerals designate corresponding features throughout the specification and figures:

Upper 3-D portion of decal 1
Self-adhesive base sheet 2
Elevated coupling structure 3
Elevated coupling ridge 3C
Elevated foam coupling plateau 3E
Air vent channel 3H
Outer vertical wall 4
Narrow horizontal cap wall 5
Interior vertical or slanted wall 6
Bottom-edge coupling band 7
Reflective layer 8
Self-adhesive light emitting diode (LED) light strip 9
Printed circuit (PC) board 10
Electronic assembly 11
Signal receptor(s) 11C
Light assembly 11L
Sound/Speaker assembly 11S
Battery 12
Battery casing 13
Wireless remote control 14
Thermoformed release liner 15
Removable adhesive layer 16
Non-thermoformed release liner 17
Semi-rigid mountable hanging board 18
Hang tab 19
String or cord 20
Glass window 21
Area of cutout or transparency 22

5.1 DESCRIPTION OF THE PREFERRED EMBODIMENT(S)

The current applicant and inventor to this application has been granted the following related patents: U.S. Pat. No. 10,201,948 issued on Feb. 12, 2019, U.S. Pat. No. 10,217, 382 issued on Feb. 26, 2019. U.S. Pat. No. 10,213,983 issued on Feb. 26, 2019, U.S. Pat. No. 10,201,949 issued on Feb. 12, 2019, and U.S. Pat. No. 10,255,831 issued on Apr. 9, 2019. Each of these patents is incorporated herein by reference in their entireties.

Figure 2:
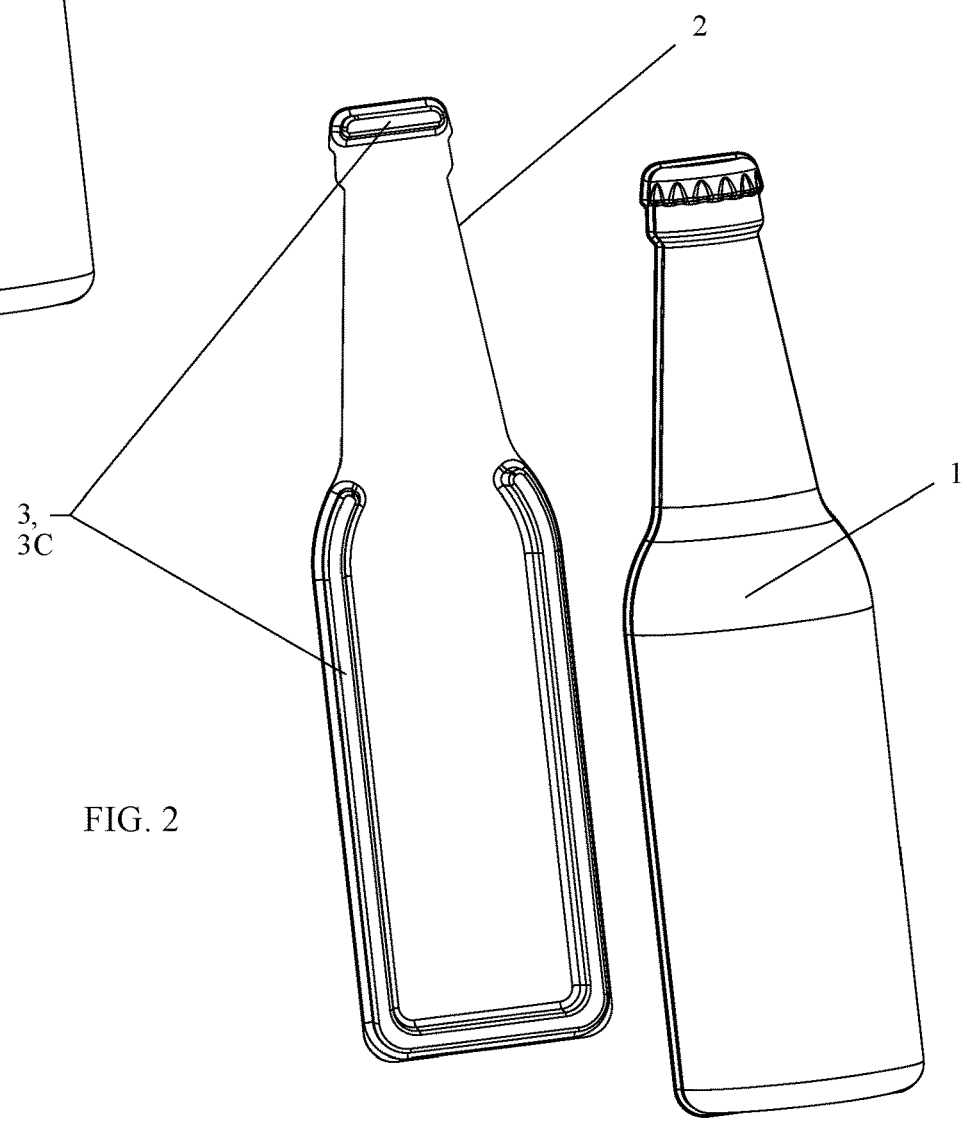
FIG. 2 is a front isometric exploded view of the 3-D decal, wherein the upper 3-D portion of the decal is shown exploded above a self-adhesive base sheet.

The present invention provides a self-adhesive 3-D decal with two main structural components and one or more non-structural components. The 3-D decal features an essentially flangeless or lipless (approximately a 1/16" lip or less) construction where the outer perimeter shape of the 3-D decal is highlighted. The decal of the present invention is comprised of two main structural components that include an upper 3-D portion 1 (FIGS. 1, 2) and a self-adhesive, semi-rigid plastic base sheet 2, as shown in FIG. 2, and can include other components (such as electronics) contained between the main structural components. Views of the outer portion of the decal from other perspectives are shown in FIGS. 12-17.

The upper 3-D portion 1 of the decal is printed and then thermoformed from a semi-rigid opaque white, translucent white, or transparent plastic sheet. The upper 3-D portion 1 of the decal does not employ adhesive. Examples of suitable thermoforming sheet materials for the upper 3-D portion 1 are PET and ABS and PVC (polyester, styrene, and vinyl). PET is relatively environmentally friendly, while ABS takes longer to degrade in landfills. However, ABS and PVC are less expensive. A flocked plastic thermoforming sheet may be utilized for the construction of the upper 3-D portion 1. Flocked sheets comprise a fibrous material layer (such as micro synthetic fur) that is affixed to the top surface of a plastic sheet. As a non-limiting example, a flocked sheet may be thermoformed into furry Easter bunny rabbits for the upper 3-D portion 1 of the decal. The preferred method for printing the decal is digital inkjet printing using specialized UV stretchable inks that are manufactured by companies such as Fujifilm, EFI, SwissQprint, Roland, and Mimaki.

Although digital inkjet printing is the preferred method for printing the upper 3-D portion 1 of the decal, other platforms may be utilized for printing. The upper 3-D portion 1 of the decal may be printed on the top or bottom surface of a semi-rigid thermoforming sheet. When printing on the top surface, the semi-rigid sheet may be opaque white, translucent white, or clear/transparent. However, when printing on the backside of the sheet, which would be advantageous to prevent the degradation of ink due to weathering, the colors are printed first, and then one or more layers of white may be printed on the backside of the colored image. The one or more layers of white provide a background that boosts the vibrancy and visibility of the colored image. When it is desirable to illuminate the 3-D decal, a translucent white ink layer or layers can additionally provide a light reflective surface that helps illuminate the decal more evenly. A white ink light-reflective surface 8 on the upper 3-D portion 1 can be essential for brightly illuminating the decal.

Another important component of the upper 3-D portion 1 of the decal (as illustrated in the enlarged cross-sectional view provided by FIG. 3B) is the integrated bottom-edge, vertically oriented coupling band 7, which may be continuous or non-continuous. The bottom-edge coupling band 7 may employ a slight negative inward draft, and may optionally circumscribe the entire bottom edge of the thermoformed structure(s). The bottom-edge, vertically oriented coupling band 7 mates via friction with the elevated structure 3 on the self-adhesive base sheet 2. Stated in a simple way, the upper 3-D portion 1 of the decal press fits over the coupling structure 3 employed by the self-adhesive base sheet 2, and these two structural parts of the decal couple together.

Figure 8:
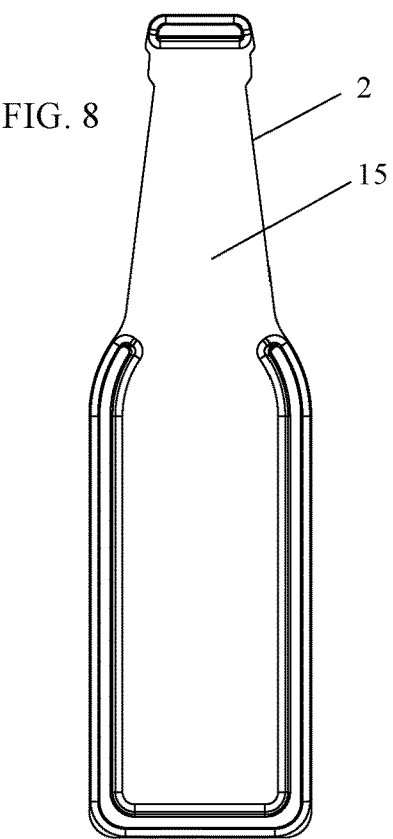
FIG. 8 is a back view of the 3-D decal, wherein the thermoformed release liner is featured.
Figure 8A:
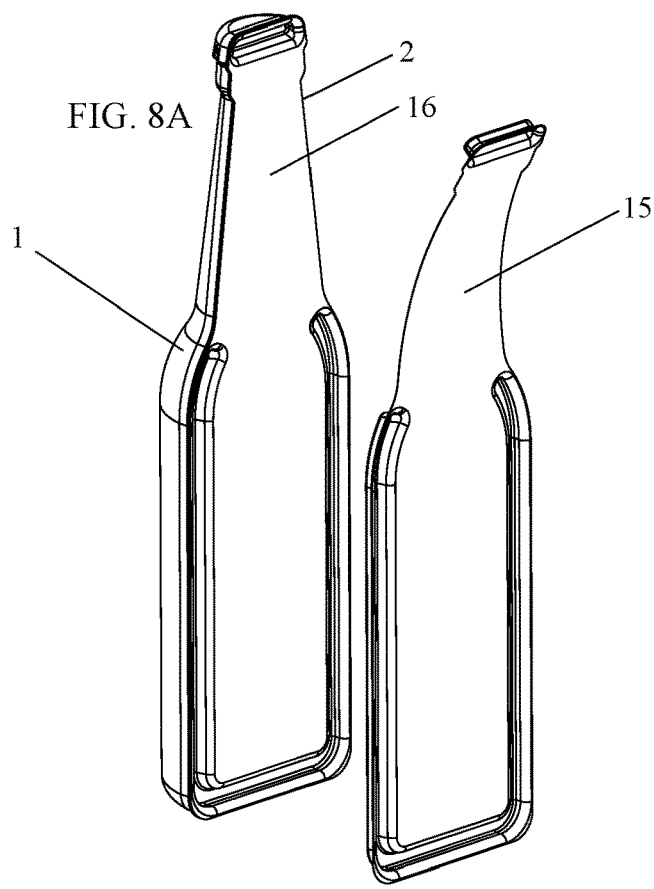
FIG. 8A is a back isometric exploded view of the 3-D decal, wherein the thermoformed release liner is shown exploded away from the thermoformed self-adhesive base sheet.
Figure 9:
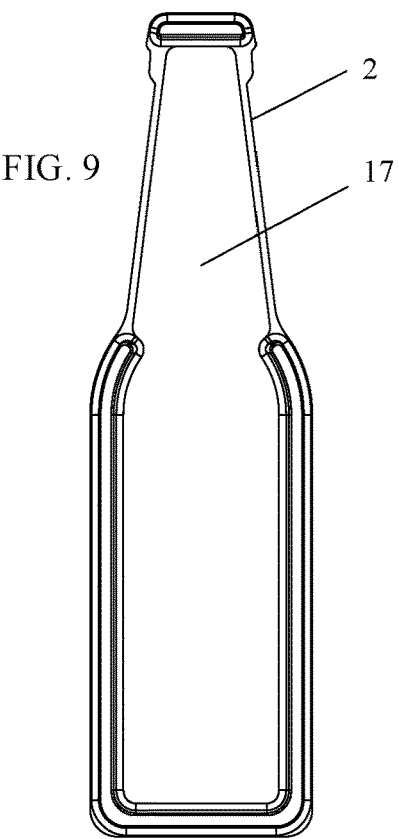
FIG. 9 is a back view of the 3-D decal wherein the non-thermoformed release liner is featured.
Figure 9A:
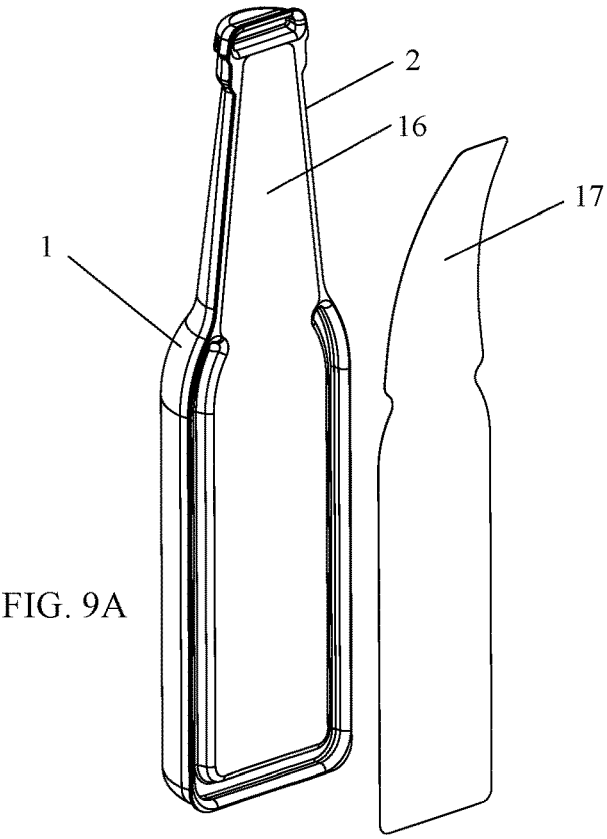
FIG. 9A is a back isometric exploded view of the 3-D decal, wherein a non-thermoformed release liner is shown exploded away from the self-adhesive base sheet.

The self-adhesive, semi-rigid base sheet 2 includes an outer perimeter continuous or non-continuous elevated coupling ridge 3, which is provided to secure the upper 3-D portion 1 of the decal to the base sheet 2. The base sheet 2 may be constructed from a PET, ABS, or PVC and preferably employs a removable adhesive layer 16, which is visible in the back exploded views provided by FIGS. 8A and 9A, and also employs a plastic or paper release liner 15, 17 (also shown in FIGS. 8A and 9A) on the bottom surface of the base sheet 2 that is located on the opposite side of the continuous or non-continuous elevated coupling structure 3. The plastic release liner may be a thermoformed release liner 15 or a non-thermoformed release liner 17. The term bottom as applied to the bottom surface of the base sheet 2 refers to the side that faces down when the 3-D decal is placed adhesive side down on a standard tabletop. The base sheet 2 may come from the manufacturer with the removable adhesive layer 16 and release liner 15, already applied, and then all the layers are thermoformed at the same time (creating a thermoformed release liner 15). Alternatively, the elevated coupling structure 3 may be thermoformed into the base sheet 2 first, and then a double-sided differential tape (that includes the removable adhesive layer 16 and a non-thermoformed paper or plastic release liner 17) may be laminated to the bottom surface of the base sheet 2. Although it is preferable to adhere the base sheet 2 to walls and windows via a removable adhesive layer 16, a static-cling vinyl layer is viable as well for adhering the 3-D decal to windows. The removable adhesive layer 16 may comprise a layer, strip, dot, square, rectangle, or other shape, or the base sheet 2 may employ one or more self-adhesive strips, such as Velcro strips.

The elevated coupling structure 3 can be either an elevated plastic or foam coupling ridge 3C or an elevated coupling plateau 3E, which are constructed differently but are functional equivalents.

In FIGS. 3, 3A, and 3B, an embodiment of the invention incorporating an elevated coupling ridge 3C in the semi-rigid base sheet 2 is illustrated. The elevated coupling ridge 3C is constructed of an outer vertical wall 4, a narrow horizontal cap wall 5, and an interior vertical or slanted wall 6. (The terms vertical and horizontal refer to the orientations when the 3-D decal is placed adhesive side down on a standard tabletop on a flat surface.) The outer vertical wall 4 of the coupling ridge 3C may employ a slight inward (toward the center region of the base sheet 2) negative draft that improves friction when the upper 3-D portion 1 of the decal mates with the coupling structure of the base sheet 2. Another way to visualize the coupling ridge 3C is to imagine it like an inverted trough. The elevated coupling ridge 3C may be thermoformed into the self-adhesive base sheet 2 (FIG. 2). The adhesive-backed base sheet 2 may be clear, white, or silver, depending upon the application.

Although it is preferable that the elevated coupling ridge 3C is thermoformed into a self-adhesive base sheet 2 (FIGS. 2, 3), the elevated coupling ridge 3C may also be cut from a self-adhesive foam sheet (5/16" thick EVA foam, for instance, as a non-limiting example). After the elevated coupling ridge 3C is cut from a foam sheet, it can be adhered to the self-adhesive, semi-rigid base sheet 2 (FIGS. 6A-C). When the 3-D decal employs a light assembly 11L (shown in FIGS. 4C, 7C), it is preferable to construct the base sheet 2 from a clear plastic, so that the light emitted by the LEDs on a self-adhesive LED light strip 9 located in the interior of the elevated coupling ridge 3C is able to travel all the way to the outside edges of the decal. If the base sheet 2 were constructed from an opaque white plastic, for example, then the elevated coupling ridge 3 is likely to impede light from reaching the outside edges of the decal. Light impediment may result in an undesirable dark band appearing at the base of the 3-D decal due to interference patterns.

When foam is used as part of the construction of the 3-D decal, the elevated coupling structure 3 may be configured as an elevated foam coupling plateau 3E instead of a ridge (FIGS. 6D-F). If the center portion of the elevated foam coupling ridge (FIGS. 6A-C) is left uncut or filled-in, then a coupling plateau 3E is formed. An elevated foam coupling plateau 3E is easy to produce: simply cut the elevated plateau 3E from a self-adhesive foam sheet that employs a removable adhesive layer 16 and a release liner 17 on the bottom surface. The self-adhesive elevated foam coupling plateau 3E is able to serve the same function as a semi-rigid plastic base sheet 2, with an elevated coupling ridge 3C so a semi-rigid plastic base sheet 2 is no longer required when an elevated foam coupling plateau 3E is utilized for the construction of the 3-D decal. The self-adhesive elevated foam coupling plateau 3E is able to fulfill multiple functions, some of which include (1) providing an outer vertical wall 4 for coupling with the upper 3-D portion 1 of the decal, and (2) providing an anchor surface for other components, such as the self-adhesive light strip 9 and battery casing 13 depicted in FIGS. 4A, 4C, 7A, and 7C. The elevated foam coupling plateau 3E may be constructed from white EVA foam, for example, so the top surface of the foam provides a reflective surface for the light strip 9. Internal light reflection is essential if a brightly illuminated 3-D decal is desired.

However, note that when the 3-D decal incorporates a light assembly 11L, the inclusion of an elevated foam coupling plateau 3E elevates the light assembly 11L so the light source, such as the self-adhesive (bendable) LED light strip 9, may not be able to reach the outer bottom edge of the 3-D decal.

Figure 6:
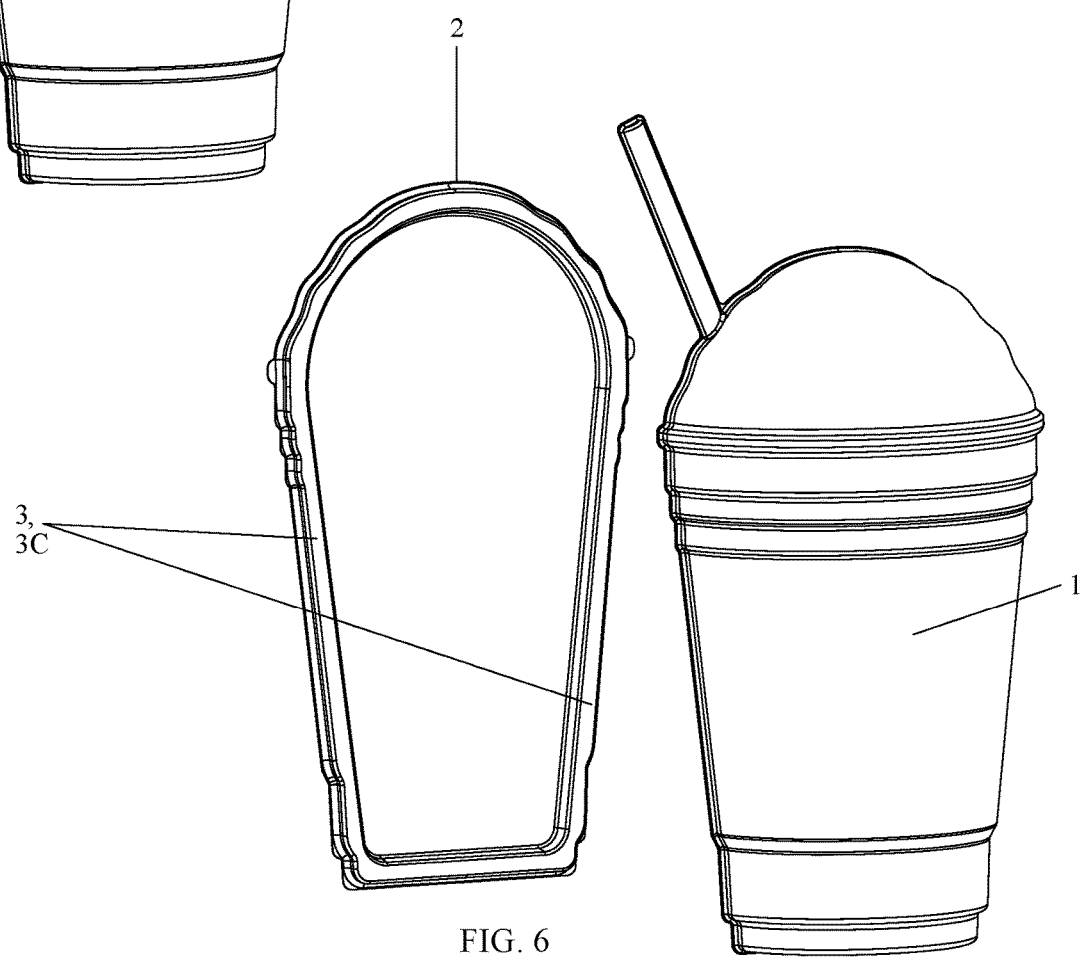
FIG. 6 is a front isometric exploded view of the 3-D decal, wherein the upper 3-D portion of the decal is shown exploded above a self-adhesive base sheet that includes a continuous thermoformed elevated coupling ridge.

In summary, the elevated coupling structure 3 on the base sheet 2 may be continuous or non-continuous and may be constructed from various materials. When the elevated coupling structure 3 is an elevated coupling ridge 3C, it may be thermoformed into a semi-rigid base sheet 2 (FIGS. 2 and 6), or alternatively, it may be attached to a semi-rigid base sheet 2 via adhesive when the elevated coupling ridge 3C is cut from a self-adhesive foam sheet (FIGS. 6A-C). A third option is to cut an elevated coupling plateau 3E from a self-adhesive foam sheet (FIGS. 6D-F). A notable attribute of using a self-adhesive elevated foam coupling plateau 3E is that it eliminates the need for a semi-rigid plastic base sheet 2, as the elevated foam coupling plateau 3E is semi-rigid itself, and has enough stiffness to allow it to substitute for the semi-rigid plastic base sheet 2.

If the elevated coupling ridge 3C or elevated coupling plateau 3E is continuous (regardless of whether it was thermoformed into a plastic sheet or cut from a self-adhesive foam sheet), it is preferable to incorporate one or more vertically oriented, inwardly projecting (toward the center of the decal) air vent channels 311, illustrated in FIGS. 6A and 6D. These air vent channels 311 may be positioned in the outer vertical wall 4 of the elevated plastic or foam coupling ridge 3C or the outer vertical wall 4 of the elevated coupling plateau 3E. The air vent channels 311 allow air to escape through them when the upper 3-D portion 1 of the decal is press-fit over the continuous elevated (thermoformed or foam) coupling ridge 3C or continuous elevated foam coupling plateau 3E. Without the air vent channels 311, air may be trapped or compressed as the parts are press-fit together, making it hard to press down the upper 3-D portion 1 of the decal onto the elevated coupling structure 3.

In some cases, to be more visually appealing, both the upper 3-D portion 1 and the semi-rigid base sheet 2 of the decal may be constructed of a semi-rigid plastic sheet with a metallic appearance. The sheet material used to construct the upper 3-D portion 1 and/or the semi-rigid base sheet 2 of the decal may be a metallized plastic sheet, or a metallic reflective ink may be printed on either component. The self-adhesive base sheet 2 may be cut into the final decal shape using a digitally controlled oscillating or ultrasonic knife-cutter, or steel rule die tool. The upper 3-D portion 1 of the decal may be cut into the final shape by using any one of the same three cutting systems. However, the preferred method for cutting out the upper 3-D portion 1 of the decal is to use a digitally controlled ultrasonic knife cutter. The upper 3-D portion 1 of the decal can also be press-fit onto the base sheet 2, and both of these layers could then be simultaneously cut using an ultrasonic knife cutter.

A hole 22 (shown in FIGS. 4, 4A, 4C, 7, 7A, and 7C) may be cut through one or more elevated regions of the upper 3-D portion 1 of the decal to provide unobstructed reception for electronic components positioned beneath the upper 3-D portion 1, such as signal receptors 11C. Alternatively, instead of a cutout 22, the upper 3-D portion 1 could employ one or more transparent regions 22 (FIGS. 7, 7A, 7C), through which an electromagnetic signal could pass.

Following the description of the main structural components, which comprise the upper 3-D portion 1 and the semi-rigid base sheet 2, the optional electronic assembly 11 that is positioned between these two main structural components is now described. The decal may employ an optional light assembly 11L, an optional sound or speaker assembly 11S, both, or neither. The light assembly 11L and/or the sound or speaker assembly 11S is shown in the front exploded views provided by FIGS. 4A, 4C, 7A, and 7C. Taken together, all the signal receptors 11C and electronic components can be referred to as the electronic assembly 11, which can include the light assembly 11L, the sound or speaker assembly 11S, both, or neither. The decal may also employ a PC board 10 to connect the individual components of the electronic assembly 11, a battery 12, and a battery casing 13, all of which are situated in the space in between the upper 3-D portion 1 and the semi-rigid base sheet 2 or elevated foam coupling plateau 3E.

The optional light assembly 11L, which comprises a light-emitting component such as an LED or a LED light strip 9, receptors 11C and controllers on the PC board 10 to control the light-emitting component, may be used in conjunction with a white or silver reflective layer 8 that may adhere to the top surface of the base sheet 2. Alternatively, when the base sheet 2 is transparent or clear, a white or silver reflective layer 8 may adhere to the bottom of the base sheet 2 via a permanent adhesive mid-layer, and a removable adhesive layer 16 and release liner 17 may then adhere to the bottom surface of the white or silver reflective layer 8. The reflective layer 8 may be paper or plastic and is optional because it is primarily used when it is desirable to illuminate the 3-D decal. If the decal is provided without illumination, then the white reflective layer 8 is not necessary, and the semi-rigid base sheet 2 may be constructed from an opaque white ABS plastic sheet, for example. When illumination is desired, it is preamble that the white or silver reflective layer 8 is high-gloss (PET, for example) and covers the entire top surface of the base sheet 2, excluding the areas where the continuous or non-continuous elevated coupling ridges 3C are located. The reflective layer 8 may utilize various methods for adhering to the top surface of the base sheet 2. The reflective layer 8 may be constructed out of white foam that also forms an elevated coupling plateau 3E that may also replace the semi-rigid base sheet 2.

Figure 4:
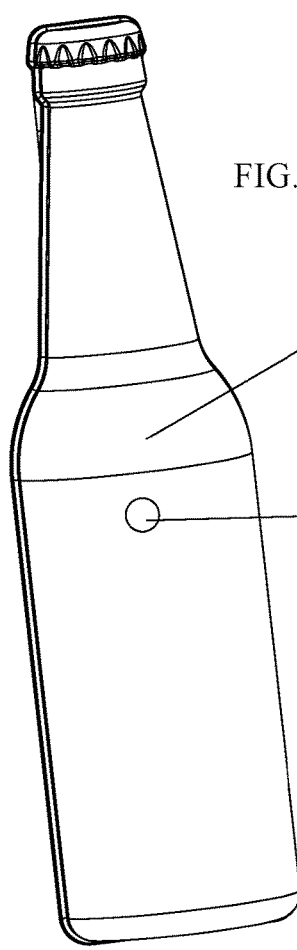
FIG. 4 is a front isometric view of a 3-D decal (bottle-shaped).
Figure 4A:
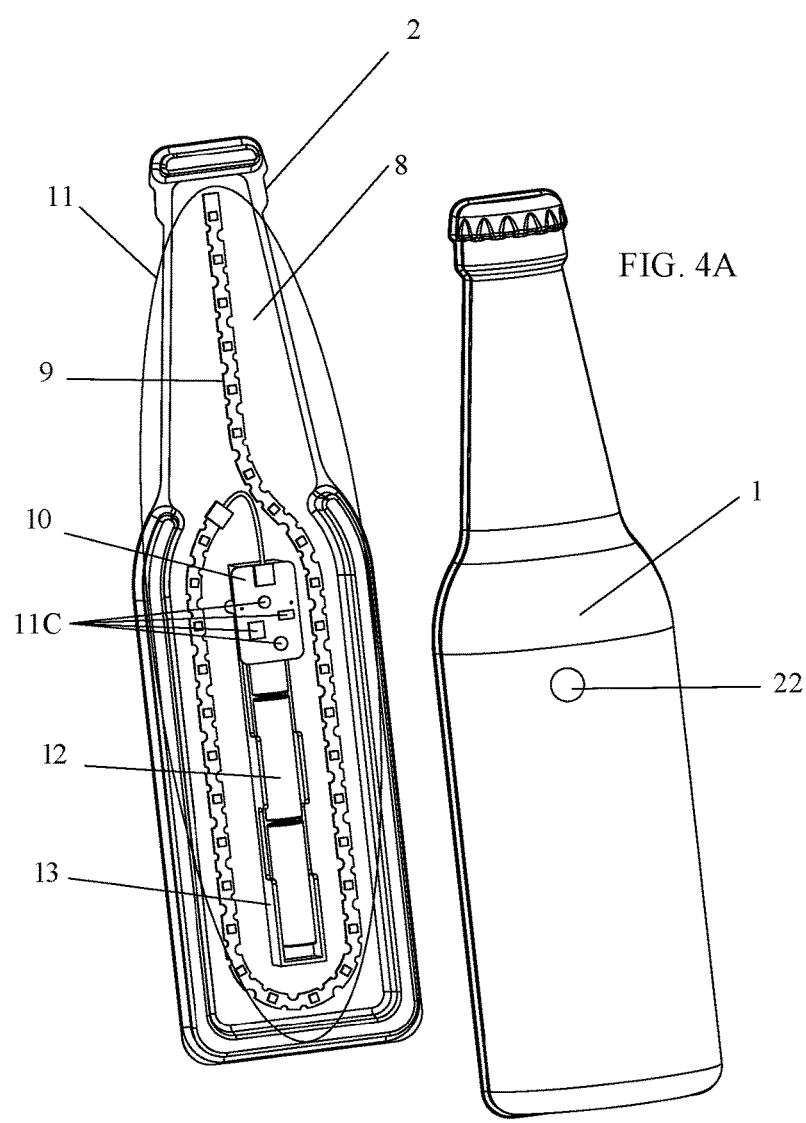
FIG. 4A is a front isometric exploded view of the 3-D decal, wherein the upper 3-D portion of the decal is shown exploded above a self-adhesive base sheet, and the electronic assembly is visible.
Figure 4B:
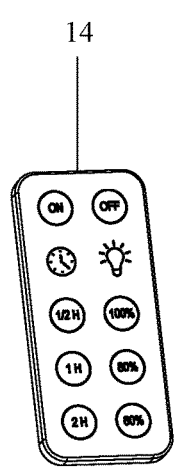
FIG. 4B is a front isometric view of the wireless remote control for the control of the electronic assembly.
Figure 4C:
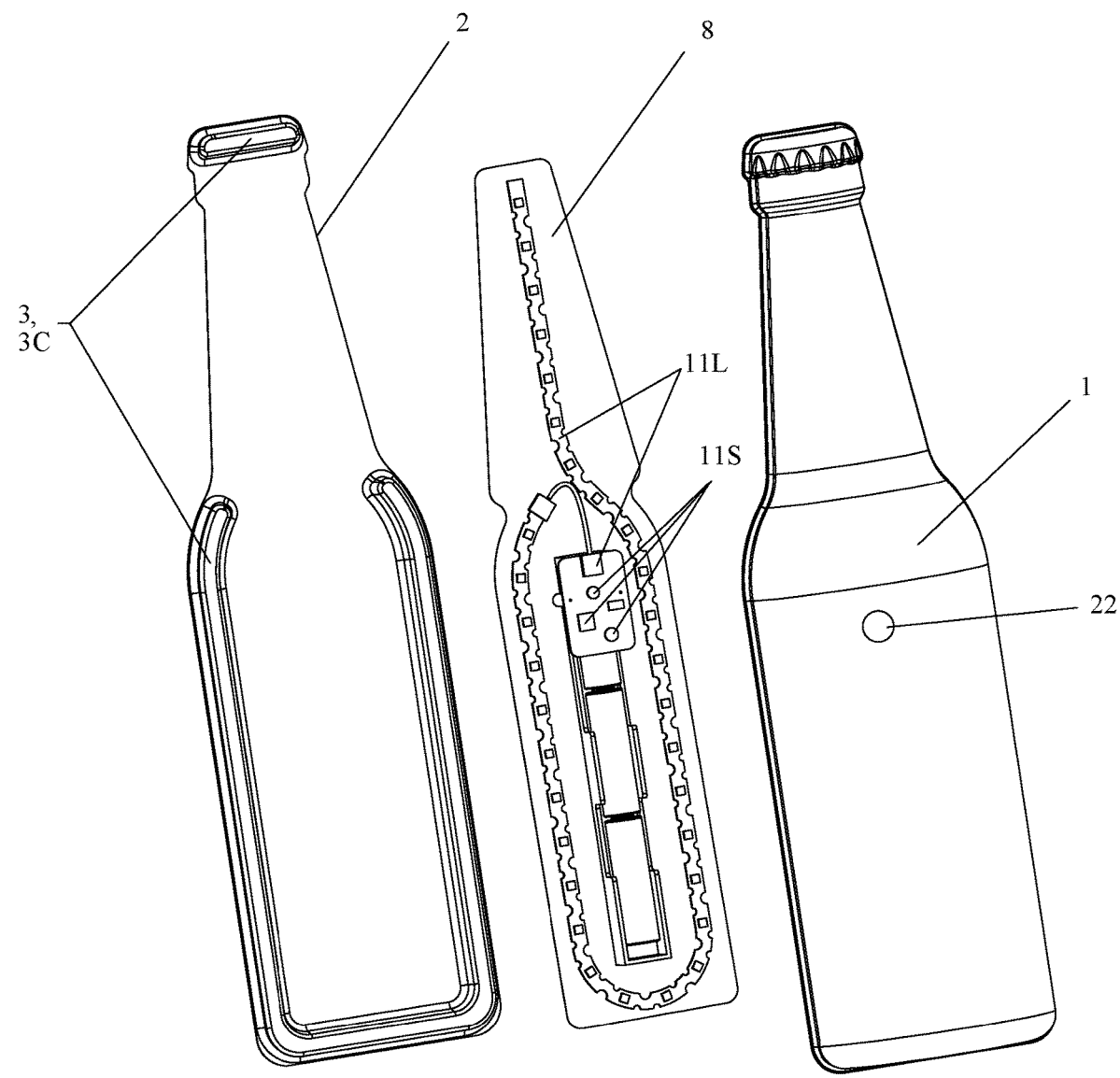
FIG. 4C is a front isometric exploded view of the 3-D decal, wherein the upper 3-D portion of the decal is shown exploded above the electronic assembly, and the electronic assembly is shown exploded above the self-adhesive base sheet.
Figure 5:
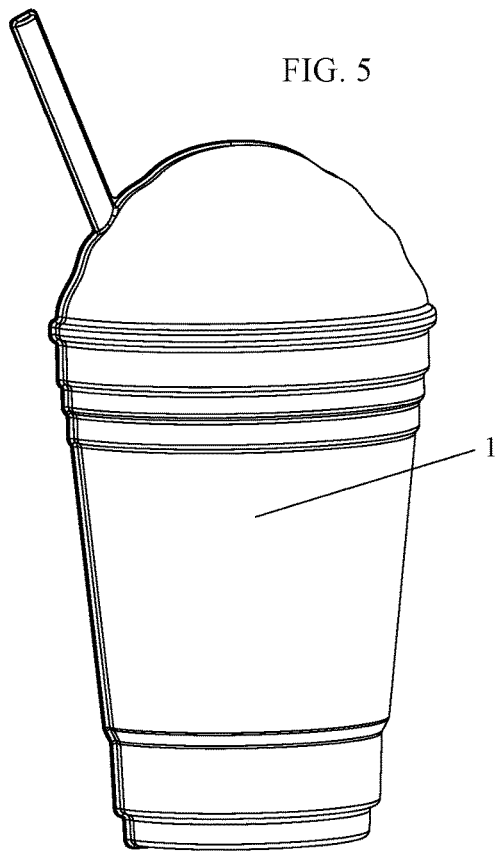
FIG. 5 is a front isometric view of a 3-D decal (cup-shaped).
Figure 7C:
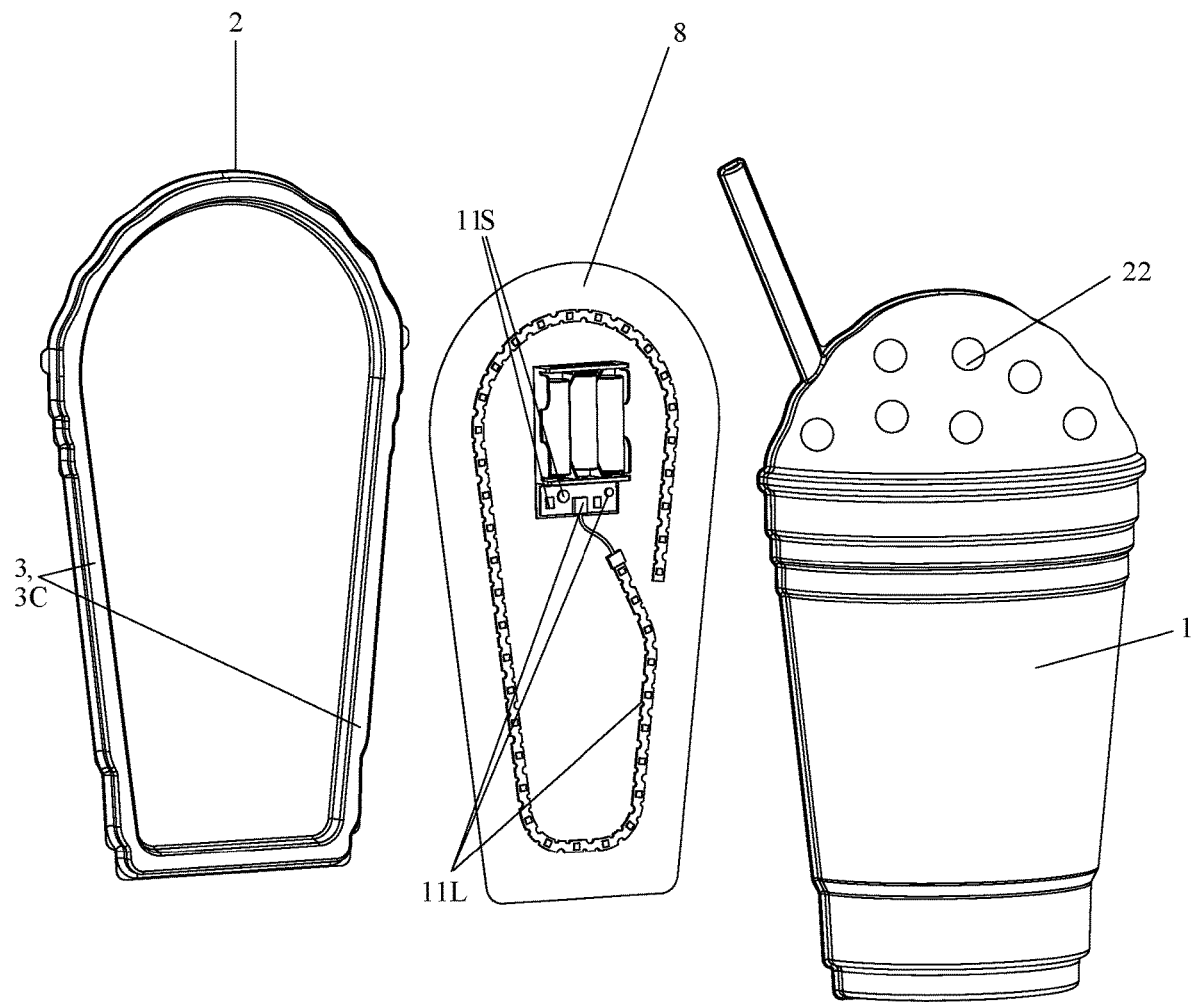
FIG. 7C is a front isometric exploded view of the 3-D decal, wherein the upper 3-D portion of the decal is shown exploded above the electronic assembly, and the electronic assembly is shown exploded above the self-adhesive base sheet.

Another point of note is that the white or silver reflective layer 8 may provide an anchor surface for the various components of the electronic assembly 11. For example, the self-adhesive (and bendable) LED light strip 9 may adhere to the white or silver reflective layer 8 by utilizing the adhesive that is supplied on the backside of the LED strip 9, while other components such as the battery casing 13 and the PC board 10 may adhere to the white or silver reflective layer 8 by simply applying a double-sided tape to the backside of these components (FIGS. 4C, 7C).

The electronic components contained in the electronic assembly 11 illustrated in FIGS. 4A, 4C, and 7A, 7C may include one or more of the following components: a self-adhesive (bendable) LED light strip 9, a PC board 10, one or more batteries 12, a battery casing 13, and one or more signal receptors 11C. The signal receptor(s) 11C may be selected from a group that includes but is not limited to: a wireless receiving sensor that receives a signal from the wireless remote control 14, a voice recognition sensor, a dimmer sensor, a proximity sensor, a music synchronizing sensor, a light sequence command sensor, a color sensor, a timer sensor, a volume control, a music synchronizing sensor, and a speaker. The sensor one or more sensors may also be positioned in a location that is outside of the perimeter shape of the 3-D decal, for example as part of the small integrate tab 19.

The electronic assembly 11 may be activated remotely, when the wireless receiving sensor receives the wireless signal sent by a remote control 14, or may be activated by voice to control the light assembly 11L or sound assembly 11S. If activated by voice, the electronic assembly 11 may include a processor for speech recognition. Through voice commands, the user may instruct the 3-D decal to turn on or off the illumination and/or sound, or the user may command the decal to stay illuminated for a specified amount of time (hence a timer sensor). The lighting assembly 11L or sound assembly 11S may employ a proximity sensor so that the 3-D decal illuminates or plays a sound when a person walks within a certain proximity of the decal. The electronic assembly may be powered by a self-contained power source such as a battery 12, and may employ a wireless remote control 14 (FIGS. 4B, 7B). The remote control 14 may turn a light 11L on and off, dim the light, change the light color, and may have settings that control how long the light stays illuminated. The remote 14 may be configured as an app on a mobile device, such that the electronic assembly 11 is controlled and activated via the app on a mobile device. The electronic assembly 11 may utilize a music synchronizing sensor so that the decal illumination pulsates or synchronizes with various types of music. Furthermore, when multiple 3-D decals are adhered to a surface such as a glass window 21 or to multiple surfaces, the electronic assembly 11 may include a sequence command sensor that instructs the decals to illuminate in a sequential or random order, or turn on or off all the 3-D decals at the same time. The 3-D decal may incorporate a sound assembly 11S that includes a speaker and a proximity sensor so the decal may talk to or play an appropriate sound to a person who walks near the decal. For example, if the 3-D decal is constructed to resemble a lion, the decal may roar at the person who walks near it.

Figure 10:
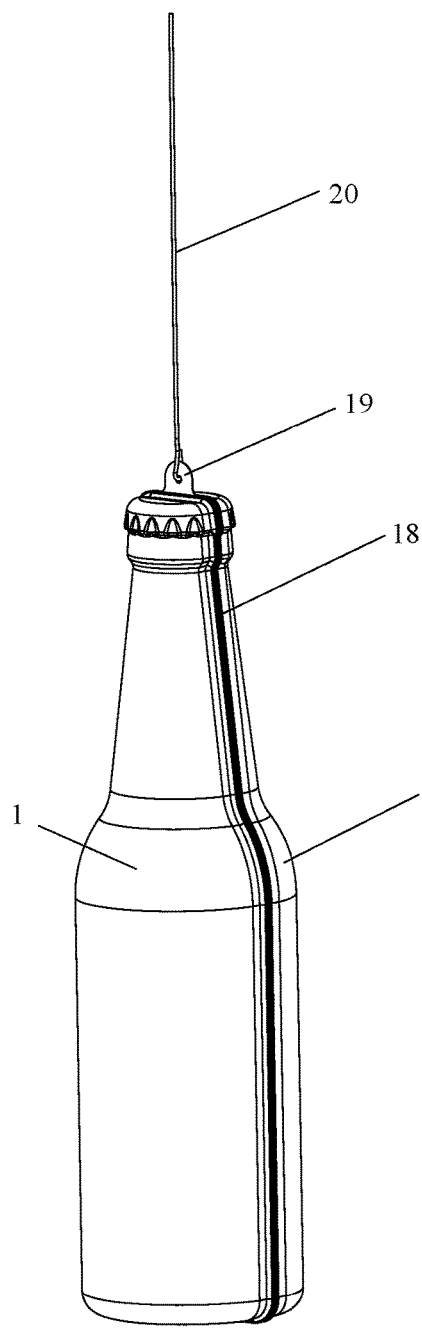
FIG. 10 is a front isometric view that shows two 3-D decals mounted to a semi-rigid hanging board, and the complete assembly is shown hanging from a string or cord.
Figure 10A:
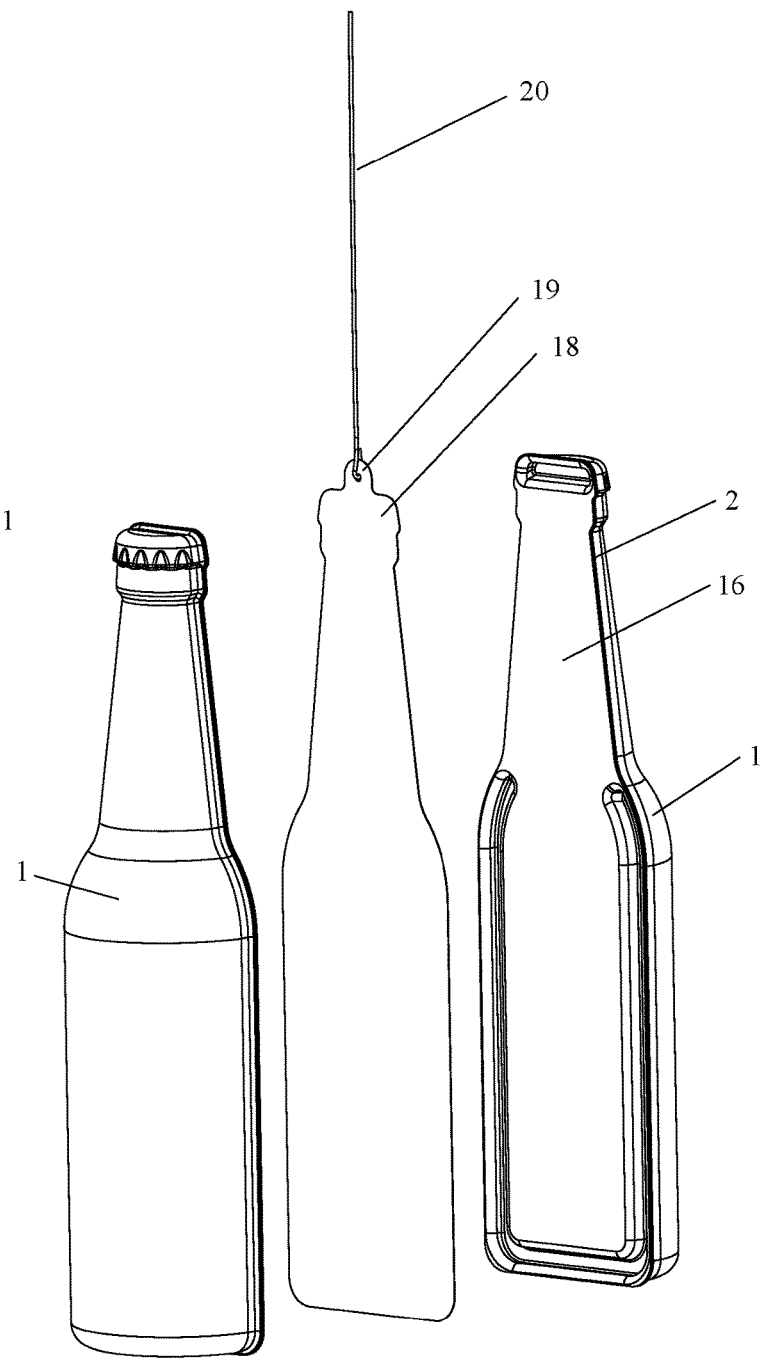
FIG. 10A is a front isometric exploded view that shows two 3-D decals exploded away from a semi-rigid hanging board.

As FIG. 10 shows, the 3-D decal may optionally feature a hang tab 19 so that it can hang by a string or cord 20. The hang tab 19 is positioned in such a way that it protrudes outside the perimeter shape (silhouette) of the 3-D decal shape. The hang tab 19 may be constructed as a part of a semi-rigid mountable hanging board 18 (FIG. 10A). Preferably, the hanging board 18 is plastic so that the decal(s) can be easily removed from the slick surface of the plastic board 18, which would be useful when changing the batteries 12, for instance. The hang tab 19 has a hole at the top, and the 3-D decal hangs from the tab 19 via the string or cord 20. If not constructed as part of a semi-rigid mountable hanging board 18, the hang tab 19 may be integrated into the outer perimeter shape of the base sheet, for example. However, a hang tab 19 construction in which the hang tab 18 is the top part of a semi-rigid mountable hanging board 18 is preferred.

Figure 11:
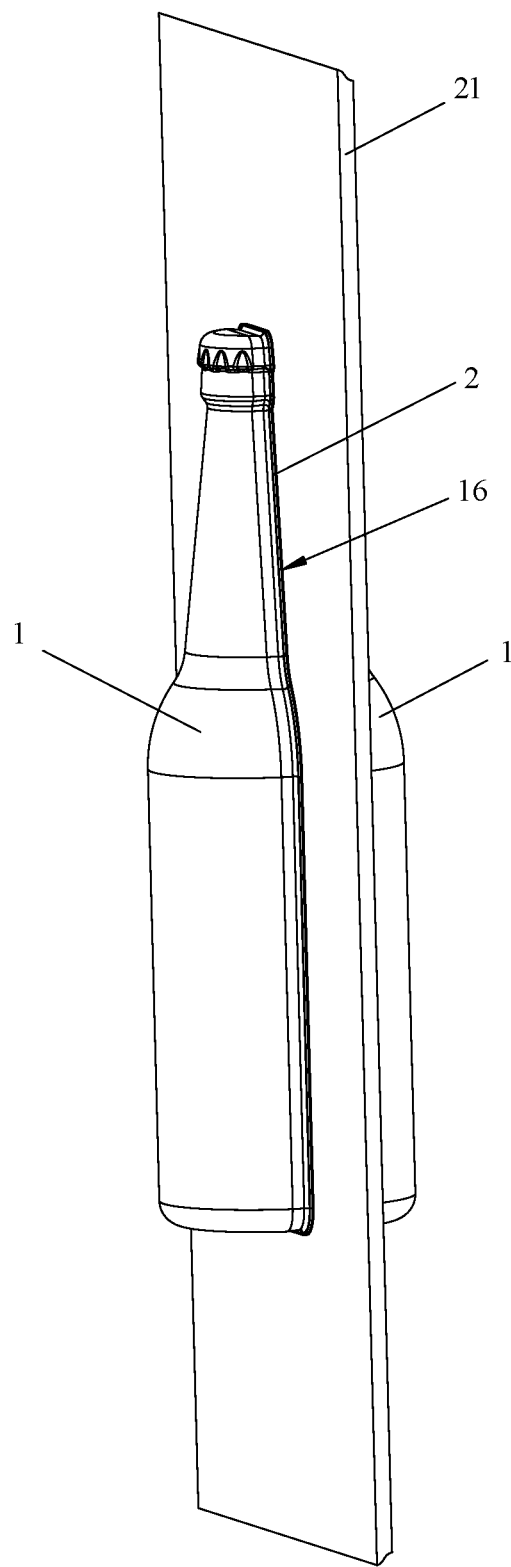
FIG. 11 is a front isometric view that shows two 3-D decals mounted back-to-back on a piece of glass.
Figure 11A:
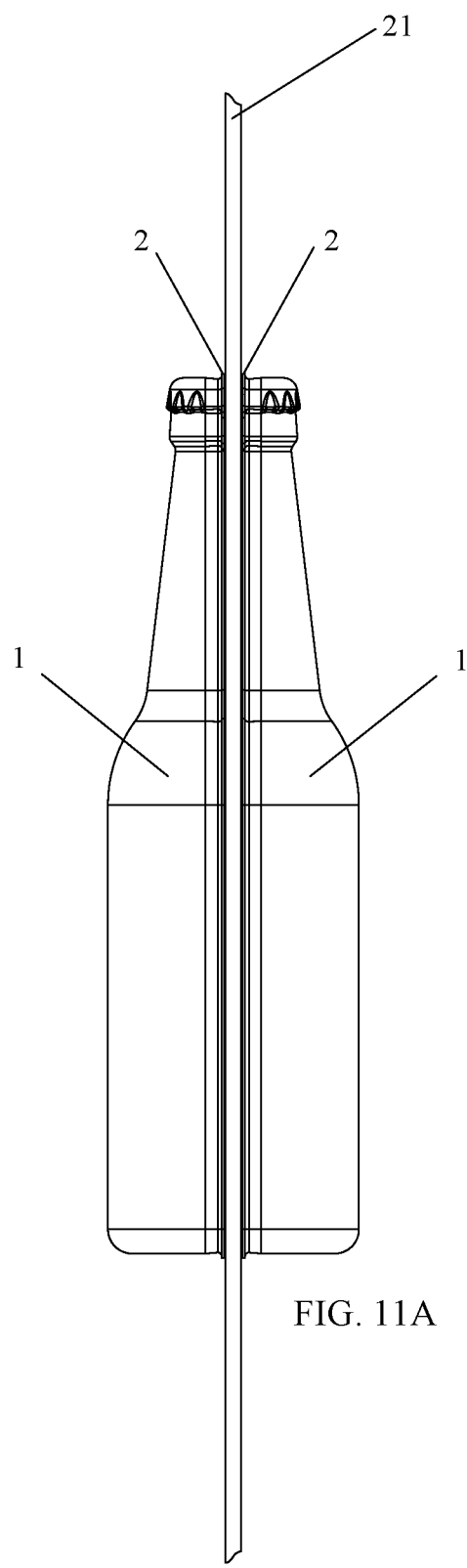
FIG. 11A is a side view that shows two 3-D decals mounted back-to-back on a piece of glass.

The 3-D decals of the present invention (first embodiment FIGS. 1-4C, second embodiment FIGS. 5-7C) are designed to mount to walls or windows. When they mount to a glass window 21 (shown in FIGS. 11, 11A), two decals may be placed in the exact same location (back-to-back), but on opposite sides of the glass, such that the two decals form a full (from both sides) 3-D decal. If only one side of the decal is to be illuminated or interactive, then on the other side of the glass window 21, one may place another upper 3-D portion 1 of the decal that does not illuminate, or is not interactive, so a full 3-D shape is formed, but only one side of the full 3-D decal will contain an electronic assembly 11 to interact with people.

The invention has been described in connection with specific embodiments that illustrate examples of the invention but do not limit its scope. Unless indicated otherwise, any feature, aspect or element of any of these example embodiments may be removed from, added to, combined with or modified by any other feature, aspect or element. As will be apparent to persons skilled in the art, modifications and adaptations to be above-described example embodiments of the invention can be made without departing from the spirit and scope of the invention, which is defined only by the following claims.

The invention claimed is:

1. A three-dimensional decal comprising:
    a semi-rigid base with a bottom surface comprising
        an elevated coupling structure with an outer vertical wall;
        a repositionable mounting layer comprised of either an adhesive or of a static cling material; and
        a release liner on the bottom surface of the base;
    an upper 3-dimensional portion thermoformed from a semi-rigid plastic sheet, comprising a bottom-edge, vertically oriented coupling band;
    wherein the coupling band is constructed to couple with the outer vertical wall of the coupling structure;
    wherein the elevated coupling structure is either (1) an elevated foam coupling ridge that adheres to a top surface of the semi-rigid plastic base; or (2) an elevated plastic coupling ridge, and the shape of which is thermoformed into the release liner, such that when the release liner is removed, the shape of the elevated coupling ridge is retained.

2. A three-dimensional decal, comprising:
    a semi-rigid plastic or foam base with a bottom surface comprising:
        an elevated plastic or foam coupling structure with an outer vertical wall, wherein the elevated coupling structure may comprise either an elevated plastic or foam coupling ridge or an elevated foam coupling plateau;
        a repositionable mounting layer comprised of either an adhesive or of a static cling material;
        a release liner on the bottom surface of the plastic or foam base, the repositionable mounting layer constructed to detachably fix the decal when mounted to a vertical surface;
    an upper 3-dimensional portion comprising:
        a high-resolution color image that is printed onto a semi-rigid plastic sheet using UV-cured stretchable inks;
        wherein the semi-rigid plastic sheet and image are thermoformed together to form the 3-dimensional portion with an inner surface that comprises a bottom-edge, vertically oriented coupling band,
    wherein the coupling band is constructed to contact the outer vertical wall of the plastic or foam coupling structure, forming a detachable friction fit sufficient to hold the 3-dimensional portion fixed relative to the a semi-rigid plastic or foam base.

3. The decal of claim 2, wherein the elevated coupling structure is an elevated coupling ridge that is thermoformed into the semi-rigid plastic base.

4. The decal of claim 3, wherein the semi-rigid base is transparent.

5. The decal of claim 2, wherein the elevated coupling structure is an elevated foam coupling ridge, and wherein the elevated foam coupling ridge adheres to a top surface of the semi-rigid plastic base.

6. The decal of claim 2, wherein the elevated coupling structure is an elevated coupling ridge, and the shape of the elevated coupling ridge is thermoformed into the release liner, such that when the release liner is removed, the shape of the elevated coupling ridge is retained.

7. The decal of claim 2, wherein the elevated coupling structure further comprises one or more air vent channels in the outer vertical wall.

8. The decal of claim 2, wherein the release liner is flat in shape and made of either paper or plastic.

9. The decal of claim 2, wherein the repositionable mounting layer comprises one or more self-adhesive strips, dots, squares, or rectangles.

10. The decal of claim 2, wherein the semi-rigid plastic sheet is transparent, translucent, or opaque, and the image is printed on a top surface of the semi-rigid plastic sheet.

11. The decal of claim 2, wherein the semi-rigid plastic sheet is transparent, and the image is printed on the back side of the semi-rigid plastic sheet.

12. The decal of claim 11, wherein the high-resolution color image comprises one or more layers of colored ink and one or more layers of white ink are printed behind the one or more layers of colored ink.

13. The decal of claim 2, wherein one or both of the semi-rigid plastic base and the upper 3-D portion is thermoformed from a semi-rigid metallized plastic sheet and/or includes a metallic reflective printing ink.

14. The decal of claim 2, wherein the upper 3-D portion comprises a thermoformable plastic sheet that is flocked with synthetic fur.

15. The decal of claim 2, wherein the elevated coupling structure is an elevated foam coupling plateau, and the elevated foam coupling plateau is white and reflective.

16. The decal of claim 2, further comprising a reflective material layer adhered to the top surface of the semi-rigid plastic base and an electronic assembly, which includes a light assembly, adhered to the reflective material layer.

17. The decal of claim 2, wherein the semi-rigid plastic base further comprises a reflective material layer adhered to the bottom surface of the semi-rigid plastic base and wherein a repositionable mounting layer is adhered to the reflective material layer.

18. The decal of claim 2, further comprising an electronic assembly adhered to a top surface of the semi-rigid plastic base or elevated foam coupling plateau.

19. The decal of claim 18, wherein the electronic assembly may include one or more of: a battery, a battery casing, a PC board, a wireless receiving sensor, a voice recognition sensor, a dimmer sensor, a proximity sensor, a music synchronizing sensor, a color sensor, a timer sensor, and a light sequence sensor.

20. The decal of claim 18, further comprising a sound assembly as part of the electronic assembly, wherein the sound assembly comprises one or more of: a volume control, a music synchronizing sensor, a speaker, and a proximity sensor.

21. The decal of claim 18, wherein the electronic assembly is constructed to be activated wirelessly by a wireless remote control or an app on a mobile device.

22. The decal of claim 18, wherein the electronic assembly may include one or more sensors located outside the perimeter shape of the upper 3-D portion.

23. The decal of claim 2, further comprising one or more signal receptors positioned in the space between the upper 3-D portion and the semi-rigid plastic base, and wherein at least one area on the surfaces of the upper 3-D portion is cutout or transparent to allow an electromagnetic, light or sound wave to pass inside the decal to the one or more signal receptors.

24. The decal of claim 2, further comprising a hang tab, wherein the hang tab is positioned at a location outside of the perimeter shape of the upper 3-D portion, and wherein the hang tab has a hole for hanging via a string or cord.

25. The decal of claim 24, further comprising a semi-rigid mountable hanging board, wherein the hang tab is attached to the semi-rigid mountable hanging board.

\* \* \* \* \*